United States Patent
Gmira et al.

(10) Patent No.: US 9,110,094 B2
(45) Date of Patent: Aug. 18, 2015

(54) MEASUREMENT OF SURFACE ENERGY COMPONENTS AND WETTABILITY OF RESERVOIR ROCK UTILIZING ATOMIC FORCE MICROSCOPY

(71) Applicants: SCHLUMBERGER TECHNOLOGY CORPORATION, Sugar Land, TX (US); SAUDI ARAMCO, Dhahran (SA)

(72) Inventors: Ahmed Gmira, Al-Khobar (SA); Wael Abdallah, Al-Khobar (SA); Mikhail Stukan, Al-Khobar (SA); Johannes J. M. Buiting, Didam (NL)

(73) Assignees: Schlumberger Technology Corporation, Sugar Land, TX (US); Saudi Arabian Oil Company, Dhahran (SA)

( * ) Notice: Subject to any disclaimer, the term of this patent is extended or adjusted under 35 U.S.C. 154(b) by 5 days.

(21) Appl. No.: 14/158,359

(22) Filed: Jan. 17, 2014

(65) Prior Publication Data
US 2015/0204903 A1  Jul. 23, 2015

(51) Int. Cl.
*G01Q 60/24* (2010.01)
*G01Q 60/38* (2010.01)
*G01Q 70/16* (2010.01)
*G01Q 70/08* (2010.01)
(Continued)

(52) U.S. Cl.
CPC ............... *G01Q 60/38* (2013.01); *G01Q 60/24* (2013.01); *G01Q 70/02* (2013.01); *G01Q 70/08* (2013.01); *G01Q 70/14* (2013.01); *G01Q 70/16* (2013.01)

(58) Field of Classification Search
CPC ....... G01Q 60/24; G01Q 60/38; G01Q 70/02; G01Q 70/08; G01Q 70/14; G01Q 70/16
See application file for complete search history.

(56) References Cited

U.S. PATENT DOCUMENTS

| 5,193,383 | A |   | 3/1993  | Burnham et al. |
| 5,371,365 | A | * | 12/1994 | Watanabe et al. ................. 850/1 |
| 5,412,980 | A |   | 5/1995  | Elings et al. |

(Continued)

FOREIGN PATENT DOCUMENTS

CN        102183450 A   *  9/2011   ............ G01Q 60/24

OTHER PUBLICATIONS

Al-Anezi, et al., "An atomic force microscope study of calcium carbonate adhesion to desalination process equipment: effect of anti-scale agent", Desalination, vol. 220, Mar. 1, 2008, pp. 359-370.

(Continued)

*Primary Examiner* — Michael Logie
(74) *Attorney, Agent, or Firm* — Bridget M. Laffey

(57) ABSTRACT

An instrument (and corresponding method) performs AFM techniques to characterize properties of a sample of reservoir rock. The AFM instrument is configured to have a probe with a tip realized from reservoir rock that corresponds to the reservoir rock of the sample. The AFM instrument is operated to derive and store data representing adhesion forces between the tip and the sample at one or more scan locations in the presence of a number of different fluids disposed between the tip and the sample. The AFM instrument is further configured to perform computational operations that process the data representing the adhesion forces for a given scan location in order to characterize at least one property of the rock sample at the given scan location. The properties can include total surface energy of the rock sample as well as wettability of the rock sample.

24 Claims, 4 Drawing Sheets

(51) Int. Cl.
*G01Q 70/14* (2010.01)
*G01Q 70/02* (2010.01)

(56) References Cited

U.S. PATENT DOCUMENTS

2003/0146380 A1 8/2003 Hough et al.
2003/0182993 A1 10/2003 Hantschel et al.
2007/0024295 A1 2/2007 Humphris et al.

OTHER PUBLICATIONS

Santner, et al., "Adhesion measurements by AFM—a gateway to the basics of friction", Federal Institute for Materials Research and Testing (BAM), Berlin, Germany, 2005, 10 pages.
Abudu et al., "Adsorption of Crude Oil on Surfaces Using Quartz Crystal Microbalance with dissipation (QCM-D) under Flow Conditions," Energy & Fuels, 2009, vol. 23: pp. 1237-1248.
Cappella et al., "Force-distance curves by atomic force microscopy," Surface Science Reports, 1999, vol. 34: pp. 1-104.
Clint, "Adhesion and components of solid surface energies," Current Opinion in Colloid & Interface Science, 2001, vol. 6: pp. 28-33.
Derjaguin et al., "Effect of Contact Deformations on the Adhesion of Particles," Journal of Colloid and Interface Science, Nov. 1975, vol. 53(2): pp. 314-326.
Ese et al., "An atomic force microscopy study of asphaltenes on mica surfaces. Influence of added resins and demulsifiers," Colloid Polym. Sci., 2000m vol. 278: pp. 532-538.
Fowkes, "Additivity of Intermolecular Forces at Interfaces. I. Determination of the Contribution to Surface and Interfacial Tensions of Dispersion Forces in Various Liquids," J. Phys. Chem., Dec. 1963, vol. 64: pp. 2538-2541.
Freer et al., "The role of interfacial rheology in reservoir mixed wettability," Journal of Petroleum Science and Engineering, 2003, vol. 39: pp. 137-158.
Hassenkam et al., "Probing the intrinsically oil-wet surfaces of pores in North Sea chalk at subpore resolution," PNAS, Apr. 2009, vol. 106(15): pp. 6071-6076.
Karoussi et al., "Macroscopic and nanoscale study of wettability alteration of oil-wet calcite surface in presence of magnesium and sulfate ions," Journal of Colloid and Interface Science, 2008, vol. 317: pp. 26-34.
Kendall et al., "Mobile ions on carbonate surfaces," Geochimica et Cosmochimica Acta, 2005, vol. 69(13): pp. 3257-3263.
Kumar et al., "SPE 93009: Atomic Force Microscopy Study of Wettability Alteration," SPE International, 2005: pp. 1-11.
Liu et al., "Adhesion force spectroscopy of model surfaces with wettability gradient," Colloids and Surfaces A: Physicochemical and Engineering Aspects, 2011, vol. 380: pp. 175-181.
Lord et al., "An AFM study of the morphological features that affect wetting at crude oil-water-mica interfaces," Colloids and Surfaces A: Physicochemical and Engineering Aspects, 2002, vol. 206: pp. 531-546.
Toulhoat et al., "Characterization by atomic force microscopy of adsorbed asphaltenes," Colloids and Surfaces A: Physicochemical and Engineering Aspects, 1994, vol. 91: pp. 267-283.
Van Oss et al., "Additive and Nonadditive Surface Tension Components and the Interpretation of Contact Angles," Langmuir, 1988, vol. 4(4): pp. 884-591.
International Search Report and Written Opinion issued in PCT/US2014/070260 on Apr. 13, 2015, 11 pages.

* cited by examiner

MEASUREMENT OF SURFACE ENERGY COMPONENTS AND WETTABILITY OF RESERVOIR ROCK UTILIZING ATOMIC FORCE MICROSCOPY

TECHNICAL FIELD

The present disclosure relates to measuring properties of reservoir rock, and in particular, to measuring surface energy components and wettability of reservoir rock at sub-micron scale.

BACKGROUND

Reservoir rock wettability is a critical parameter in any reservoir characterization. To assess this parameter, conventional techniques such as imbibition tests (Amott-Harvey and USBM), contact angles and NMR are used in oilfield. These techniques provide a relative assessment of rock wettability, but do not provide an accurate wettability measurement and neither one considers the rock surface morphology and rock/fluids interactions at sub-micron scale.

Atomic force microscopy (AFM) is currently used extensively for imaging surfaces and getting force-distance measurements between a tip and a surface. AFM images have been used to confirm the deposition of oil components on mineral surfaces as described in "The role of interfacial rheology in reservoir mixed wettability," by M. Freer, T. Svitova, C. J. Radke, Journal of Petroleum Science and Engineering, Vol. 39, No. 1, pp. 137-158, 2003, and H. Toulhoat, C. Prayer, G. Rouquet, Colloid Surf. A: Phys. Eng. Asp., Vol. 91, pg. 267, 1994. AFM imaging has also been used to study the effect of adding resins to asphaltene solution on aggregation at a mineral surface in M.-H. Ese, J. Sjoblom, J. Djuve, R. Pugh, Colloid. Polym. Sci., Vol. 278, pg. 532, 2000. They found that the addition of resins increased the size of asphaltene aggregates. In H. Toulhoat, C. Prayer, G. Rouquet, Colloid Surf. A: Phys. Eng. Asp., Vol. 91, pg. 267, 1994, AFM was used to study the adsorption of asphaltene extracted from different crude oils and observed a change in contact angles due to asphaltene adsorption. In "Atomic Force Microscopy Study of Wettability Alteration" by K. Kumar, E. K. Dao, K. K. Mohanty, International Symposium on Oil Field Chemistry, Houston, Tex., (2005), SPE 93009, it was demonstrated that wettability of mica (Muscovite) and calcite with SARA fractions (Saturates, Asphaltenes, Resins and Aromatics) is controlled by the adsorption of asphaltene components and the force of adhesion measured for minerals aged with just the asphaltene fraction is similar to that of the whole oil. D. L. Lord, J. S. Buckley, Colloid Surf. A: Phys. Eng. Asp., Vol. 206, No. 53, pgs. 1-546, 2002 observed micron- and nanometer-scale changes in topography on mica surfaces before and after exposure to crude oil. Density of coverage and film structure is found to be related to exposure time and crude oil chemistry. A. Abudu, L. Goual, Energy & Fuels, Vol. 23, pgs. 1237-1248, 2009 concluded that adsorption of crude oil results in rigid films with an average thickness of about 3.5 nm. O. Karoussi, A. A. Hamouda, J. Colloid Interface Sci Vol. 317, pgs. 26-34, 2008 studied the effect of $Mg^{2+}$ and $SO_4^{2-}$ on wettability alteration of calcite surface at nano-scale by AFM and contact angle measurements and they found that magnesium ions increases the water wetness of calcite and showed good correlation between contact angle and AFM measurements. The same agreement was found by J. Liu, B. Yu, B. Ma, X. Song, X. Cao, Z. Li, W. Yang, F. Zhou, Colloid Surf. A: Phys. Eng. Asp., Vol. 380, pgs. 175-181, 2011. T. Hassenkam, L. L. Skovbjerg, S. L. S. Stipp, PNAS, Vol. 16, No. 15, pgs. 6071-6076, 2009 using a hydrophobic AFM probe to investigate wettability at pore scale level and concluded that wetting, as a macroscopic parameter, averages the nanoscopic behavior along fluid pathways, and mixed-wet samples have patches with vastly different properties.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to an instrument (and corresponding method) that performs AFM techniques in order to characterize properties of a sample of reservoir rock. The AFM instrument is configured to have a probe with a tip realized from reservoir rock that corresponds to the reservoir rock of the sample. The AFM instrument is operated to derive and store data representing adhesion forces between the tip and the sample at one or more scan locations in the presence of a number of different fluids disposed between the tip and the sample. The AFM instrument is further configured to perform computational operations that process the data representing the adhesion forces for a given scan location in order to characterize at least one property of the rock sample at the given scan location. The properties can include total surface energy of the rock sample as well as wettability of the rock sample.

In some embodiments, the AFM instrument can be configured to perform lateral force spectroscopy (LFS) where the tip-sample interaction forces are measured as the sample is displaced in the vertical direction relative to the probe. The result of this measurement is called a force curve.

Various embodiments of the present disclosure are also directed to computational operations that process the adhesion measurements in the presence of the different fluids to solve for two surface energy components—a first surface energy component arising from dispersion forces, and a second surface energy component arising from polar forces related to hydrogen bonding. Wettability of reservoir rock can be estimated from surface energy components of the rock/fluid system according to Young's equation.

BRIEF DESCRIPTION OF THE DRAWINGS

The subject disclosure is further described in the detailed description which follows, in reference to the noted plurality of drawings by way of non-limiting examples of embodiments of the subject disclosure, in which like reference numerals represent similar parts throughout the several views of the drawings, and wherein.

DESCRIPTION OF THE ILLUSTRATED EMBODIMENTS

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Figure 1:
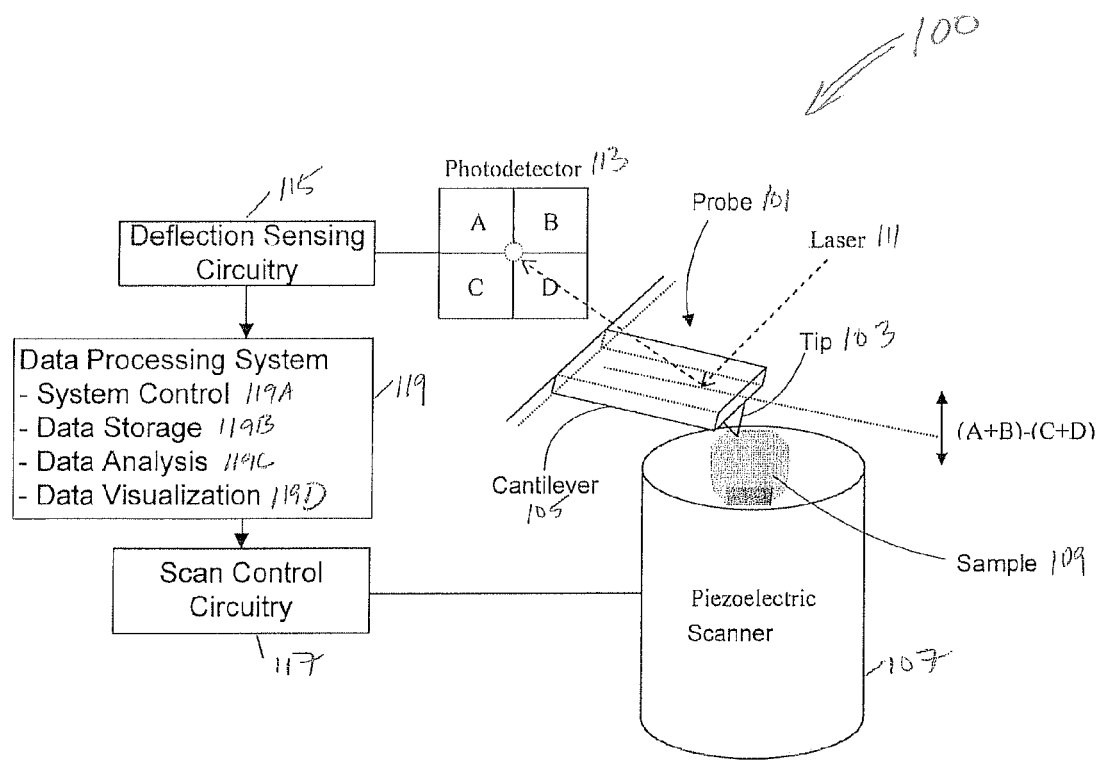
FIG. 1 is a schematic diagram of an AFM instrument that is capable of implementing the techniques described herein.

FIG. 1 illustrates an AFM instrument 100 that is capable of implementing the techniques described herein. The AFM instrument 100 includes a probe 101 with a sharp tip 103 that is situated at the apex of a flexible cantilever 105 (which is often V-shaped and normally made of silicon). The probe 101 is positioned over a piezoelectric scanner 107 that holds a sample 109. The piezoelectric scanner 107 moves the sample 109 with a sub-nanometer displacement in response to an applied voltage. In particular, the piezoelectric scanner 107 can be operated to move the sample 109 in three dimensions relative to the tip 103. When the tip 103 is brought into close proximity of the sample surface, forces between the tip 103 and the sample 109 lead to a deflection of the cantilever 105 according to Hooke's law. Laser light from a laser diode 111 is reflected off the cantilever 105 and collected by a photodetector 113, comprising four closely spaced photodiodes (A, B, C, D). The output signals of the photodiodes of the photodetector 113 are processed by deflection sensing circuitry 115 to derive a signal proportional to the deflection of the cantilever 105. Scan control circuitry 117 supplies appropriate voltage signals to the piezoelectric scanner 107 to control the position of the sample 109 relative to the tip 103 as desired. A data processing system 119 interfaces to both the deflection sensing circuitry 115 and the scanner control circuitry 117. The data processing system 119 includes a system control module 119A that controls the tasks of data acquisition (involving the interfacing to both the deflection sensing circuitry 115 and the scanner control circuitry 117) as well as other supervisory control tasks of the AFM instrument 100. The data processing system 119 also includes a data storage function 119B (such as file system or database) that stores data generated during data acquisition in persistent storage (for example, such data can represent deflection of the tip 103 as a function of sample position). The data processing system 119 also includes a data analysis module 119C that is configured to analyze the data generated during data acquisition and stored in persistent storage by the data storage function 119B. The data analysis module 119C can cooperate with the data storage function 119B to store the results of such data analysis in persistent storage. The data processing system 119 also includes a data visualization module 119D that is configured to generate visual representation of the results of the data analysis for display on a display device. The data processing system 119 can be realized by at least one computer and associated electronics and software. The data processing system 119 can be realized by a desktop computer, a workstation, a laptop computer, an industrial computer and/or one or more embedded processors. In alternate embodiments, the data processing system 119 can be realized by multiple computer systems where the data processing tasks are performed over the multiple computer systems, or the data processing system 119 can be realized by a distributed computer processing system with a number of data processing nodes where the data processing tasks are performed over the data processing nodes of the system.

The AFM instrument 100 can be configured to perform lateral force spectroscopy (LFS) where the tip-sample interaction forces are measured as the sample 109 is displaced in the vertical direction relative to the probe 101 by operation of the piezoelectric scanner 107 under control of the system control module 119A and scan control module 117. The result of this measurement is called a force curve. For this methodology, the tip 103 is extended towards and refracted from the sample surface as the deflection of the cantilever is monitored by operation of the deflection sensing circuitry 115 and the system control function 119A. These measurements can be used such that data storage function 119B records force curves over a large number of sample surface locations. The data analysis module 119C can analyze the force curves recorded by the data storage function 119B in order to obtain the following information: the magnitude of the force which depends on long-range attractive and adhesion forces, estimation of the point of the tip-sample contact, the tip-sample contact area and the elastic modulus and plasticity of films.

Figure 2:
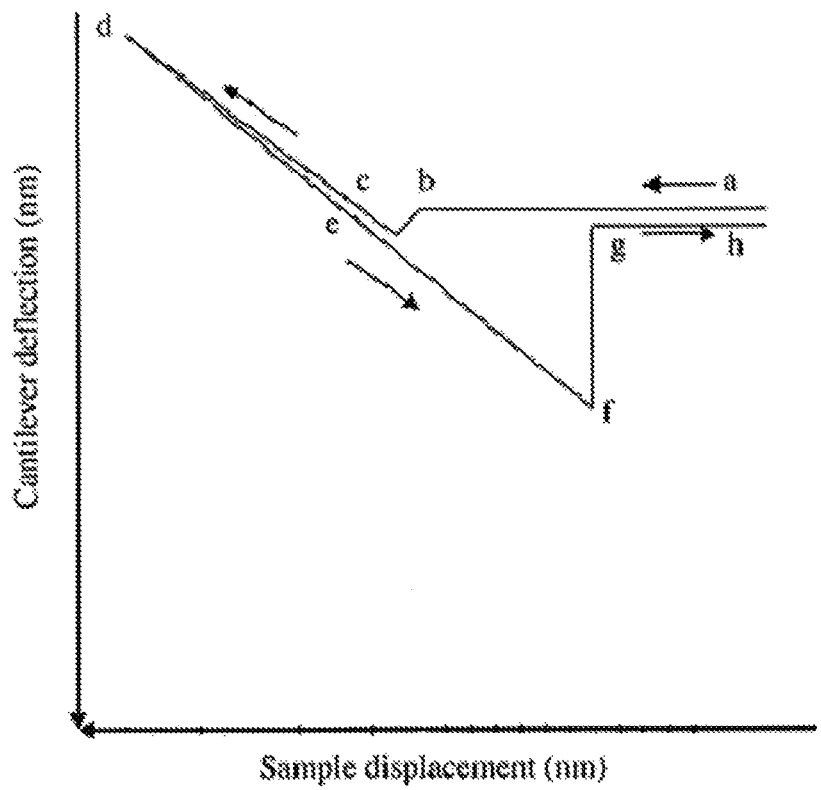
FIG. 2 is a force curve measured by the AFM instrument of FIG. 1.

FIG. 2 illustrates a force curve derived from LFS. The force curve is determined by a cycle of operations carried out by the AFM instrument 100 at a particular location (e.g., at particular X, Y coordinates) on the sample surface. At the start of the cycle, a large distance (e.g., in the Z coordinate) separates the tip 103 and the sample 109. There is no interaction between the tip 103 and sample 109 and the cantilever 105 remains in a non-interacting equilibrium state (point (a)). As the separation of the tip 103 and the sample 109 decreases, the tip 103 is brought into near contact with the sample 103 at a constant velocity until it reaches a point close to the sample surface. As the sample 109 moves towards the tip 103 various attractive forces pull on the tip 103 (long- and short-range forces). Once the total force gradient acting on the tip 103 exceeds the stiffness of the cantilever 105, the tip jumps into contact with the sample surface ((b) - - - (c)). At point (d), the tip 103 and the sample 109 are in contact and deflections are dominated by mutual electronic repulsions between overlapping molecular orbitals of the tip and sample atoms. The shape of segment (c) - - - (d) indicates whether the sample 109 is deforming in response to the force from the cantilever 105. The slope of the curve in the contact region (segment (c) - - - (d)) is a function of the elastic modulus and geometries of the tip 103 and the sample 109 and will approach unity for rigid systems. This slope can be used to derive information about the hardness of the sample 109 or to indicate differing sample responses at different loadings. During the withdrawal curve of segment (d) - - - (h), as the tip-sample surface distance decreases in segment (e) - - - (f), adhesion or bonds formed during contact between the tip 103 and the sample 109 cause the tip 103 to adhere to the sample 109 up to some distance beyond the initial contact point (b) on the approach curve. As the piezoelectric scanner continues retracting, the spring force of the bent cantilever 105 overcomes the adhesion forces and the cantilever 103 pulls off sharply, springing upwards to its undeflected or noncontact position in segment (f) - - - (g). Finally, the tip-sample surface distance continues to decrease and the tip completely loses contact with the surface and returns to its starting equilibrium position in segment (g) - - - (h).

The force curve of FIG. 2 can be divided roughly into 3 regions: the contact line, the non-contact line and the zero line. The zero line is obtained when the tip 103 is far from the sample 109 and the cantilever deflection is close to zero. When the sample 109 is pressed against the tip 103, the corresponding cantilever deflection plot is called the contact line and this line can provide information on sample stiffness. The most interesting regions of the force curve are the two noncontact regions, containing the jump-to-contact and the jump-off-contact. The noncontact regions of the force curve provide information about attractive forces (van der Waals or Coulomb forces) and repulsive forces (van der Waals forces in some liquids, double-layer, hydration and steric forces in colloid mixtures).

The deflection of the cantilever 105 can be modeled as a spring where the force F acting on the cantilever is related to the deflection $\delta_c$ of the cantilever according to Hooke's law as follows:

$$F_c = k_c \delta_c, \quad (1)$$

where $k_c$ is the spring constant of the cantilever, which is dependent on the elastic properties of the material of the cantilever.

In this case, the pull-off force $F_{pull\text{-}off}$ acting on the cantilever 105 at a given scan location (X,Y position of the piezoelectric scanner 107) at the time that the bent cantilever overcomes the adhesion forces and the cantilever 105 pulls off sharply, can be derived from Eqn. (1) where the deflection $\delta_c$ of the cantilever 105 is derived from magnitude of section (f) - - - (g) of the force curve at the given scan location.

Adhesion forces are measured using test bodies. The most common test body is a spherical microparticle. In this case, the adhesion force $F_{adh}$ between the spherical microparticle and the sample surface can be equated to the pull-off force $F_{pull\text{-}off}$ at the given scan location as follows:

$$F_{adh} = F_{pull\text{-}off} \quad (2)$$

The adhesion force $F_{adh}$ is not related in a simple way to the work of adhesion $W_{adh}$. Instead, the adhesion force $F_{adh}$ is typically related to the work of adhesion $W_{adh}$ utilizing one of the following two approximations. The first approximation, which is based on the model of Johnson, Kendall and Roberts (commonly referred to as the JKR model), is given by:

$$F_{adh} = 1.5 \pi R W_{adh}, \quad (3)$$

where R is the radius of the tip 103.

This approximation is valid for compliant materials with high surface energy, and for large microparticles (e.g., where R in the μm range). The second approximation, which is based on the model of Derjaguin, Muller and Toporov (commonly referred to as the DMT model), is given by:

$$F_{adh} = 2 \pi R W_{adh}, \quad (4)$$

where R is the radius of the tip 103.

This approximation is valid for stiff materials with low surface energies, and small microparticles (e.g., where R is in the low nm range). In both approximations, the contacting test body (the spherical microparticle) is considered elastic, and the viscoelasticity of the tip 103 and the sample surface is not taken into account.

With the tip 103 and the sample surface realized from the same solid material (s) and a fluid medium (k) disposed between the tip and the sample surface, the work of adhesion $W_{adh}$ between the tip 103 and the sample surface can be equated to the work of adhesion $W_{sks}$ between the surfaces of solid material (s) in the fluid medium (k), which can be expressed in terms of the interfacial tension $\gamma_{sk}$ of the respective solid/fluid medium interfaces as follows:

$$W_{adh} = W_{sks} = 2\gamma_{sk}. \quad (5)$$

A commonly used approach expresses surface energy as the sum of the component due to dispersion forces ($\gamma^d$) and the component due to polar forces related to hydrogen bonding ($\gamma^p$) to give:

$$\gamma = \gamma^d + \gamma^p. \quad (6)$$

The component $\gamma^d$ is typically referred to as the Lifshitz-van der Waals component and can be labeled $\gamma^{LW}$.

In an attempt to take into account the chemical nature of the phase, van Oss et al. suggested that the polar component $\gamma^p$ could be better described in terms of acid-base interactions. See Oss et al., "Additive and nonadditive surface tension components and the interpretation of contact angles," Langmuir 4, 884-891, 1988. In this case, unlike the component $\gamma^{LW}$, the polar component $\gamma^p$ comprises two complementary parameters ($\gamma^+$, $\gamma^-$). $\gamma^+$ is electron-acceptor surface tension parameter, and $\gamma^-$ is the electron donor surface tension parameter.

The interfacial tension between two phases α and β can be expressed in terms of the two components ($\gamma^{LW}$ and $\gamma^p$) for each phase as follows:

$$\gamma_{\alpha\beta} = \left(\sqrt{\gamma_\alpha^{LW}} - \sqrt{\gamma_\beta^{LW}}\right)^2 + 2\left(\sqrt{\gamma_\alpha^+ \gamma_\alpha^-} + \sqrt{\gamma_\beta^+ \gamma_\beta^-} - \sqrt{\gamma_\alpha^+ \gamma_\beta^-} - \sqrt{\gamma_\alpha^- \gamma_\beta^+}\right). \quad (7)$$

For the case where the two phases α and β are a solid s and non-polar fluid f1, respectively, Eqn. (7) can be rewritten as:

$$\gamma_{sf1} = \gamma_s^{LW} + \gamma_{f1}^{LW} - 2\sqrt{\gamma_s^{LW} \gamma_{f1}^{LW}} + 2\sqrt{\gamma_s^+ \gamma_s^-}, \quad (8)$$

where $\gamma_{f1}^+ = \gamma_{f1}^- = 0$ because the fluid f1 is non-polar.

For the case where the tip 103 and the sample surface are realized from the same solid material (s) and a non-polar fluid f1 is disposed between the tip 103 and the sample surface, Eqn. (8) can be combined with Eqn. (5) to provide:

$$W_{sf1s}/2 = \gamma_s^{LW} + \gamma_{f1}^{LW} - 2\sqrt{\gamma_s^{LW} \gamma_{f1}^{LW}} + 2\sqrt{\gamma_s^+ \gamma_s^-}. \quad (9)$$

For the case where the two phases α and β are a solid s and a non-polar fluid f2, respectively, Eqn. (7) can be rewritten as:

$$\gamma_{sf2} = \gamma_s^{LW} + \gamma_{f2}^{LW} - 2\sqrt{\gamma_s^{LW} \gamma_{f2}^{LW}} + 2\sqrt{\gamma_s^+ \gamma_s^-}, \quad (10)$$

where $\gamma_{f2}^+ = \gamma_{f2}^- = 0$ because the fluid f2 is non-polar.

For the case where the tip 103 and the sample surface realized from the same solid material (s) and a non-polar fluid f2 is disposed between the tip 103 and the sample surface, Eqn. (10) can be combined with Eqn. (5) to provide:

$$W_{sf2s}/2 = \gamma_s^{LW} + \gamma_{f2}^{LW} - 2\sqrt{\gamma_s^{LW} \gamma_{f2}^{LW}} + 2\sqrt{\gamma_s^+ \gamma_s^-}. \quad (11)$$

Subtraction of Eqn. (11) from Eqn. (9) gives:

$$\frac{1}{2}(W_{sf1s} - W_{sf2s}) = (\gamma_{f1}^{LW} - \gamma_{f2}^{LW}) - 2\sqrt{\gamma_s^{LW}} \left(\sqrt{\gamma_{f1}^{LW}} - \sqrt{\gamma_{f2}^{LW}}\right). \quad (12)$$

Eqn. (12) can be rewritten to solve for $\gamma_s^{LW}$ as:

$$\gamma_s^{LW} = \left(\frac{(\gamma_{f1}^{LW} - \gamma_{f2}^{LW}) - \frac{(W_{sf1s} - W_{sf2s})}{2}}{2\left(\sqrt{\gamma_{f1}^{LW}} - \sqrt{\gamma_{f2}^{LW}}\right)}\right)^2. \quad (13)$$

For the case where the two phases α and β are a solid s and a polar fluid f3, respectively, Eqn. (7) can be rewritten as:

$$\gamma_{sf3} = \gamma_s^{LW} + \gamma_{f3}^{LW} - 2\sqrt{\gamma_s^{LW}\gamma_{f3}^{LW}} + \quad (14)$$
$$2\sqrt{\gamma_s^+\gamma_s^-} - 2\sqrt{\gamma_{f3}^-\gamma_s^-} - 2\sqrt{\gamma_{f3}^-\gamma_s^+} + 2\sqrt{\gamma_{f3}^+\gamma_{f3}^-}.$$

For the case where the tip and the sample surface realized from the same solid material (s) and a polar fluid f3 is disposed between the tip and the sample surface, Eqn. (5) can be combined with Eqn. (14) to provide:

$$\frac{W_{sf1s}}{2} = \gamma_s^{LW} + \gamma_{f3}^{LW} - 2\sqrt{\gamma_s^{LW}\gamma_{f3}^{LW}} + \quad (15)$$
$$2\sqrt{\gamma_s^+\gamma_s^-} - 2\sqrt{\gamma_{f3}^-\gamma_s^-} - 2\sqrt{\gamma_{f3}^-\gamma_s^+} + 2\sqrt{\gamma_{f3}^+\gamma_{f3}^-}.$$

Subtraction of Eqn. (15) from Eqn. (9) gives:

$$\sqrt{\gamma_s^+\gamma_{f3}^-} + \sqrt{\gamma_s^-\gamma_{f3}^+} = \quad (16)$$
$$A = \frac{(\gamma_{f3}^{LW} - \gamma_{f1}^{LW})}{2} - \frac{(W_{sf3s} - W_{sf1s})}{4} + \sqrt{\gamma_{f3}^+\gamma_{f3}^-}.$$

When using non-polar fluid between two solid surfaces, equation (9) can be written as:

$$\frac{W_{sf1s}}{2} = \gamma_{sf1}^{LW} + 2\sqrt{\gamma_s^+ \cdot \gamma_s^-}. \quad (17)$$

Also Eqn. (17) can be rewritten to solve for $\gamma_s^+$ as follows:

$$\gamma_s^+ = \left[\frac{(W_{sf1s} - 2\gamma_{sf1}^{LW})}{4\sqrt{\gamma_s^-}}\right]^2, \quad (18)$$

Eqn. (18) can be combined with Eqn. (16) to provide:

$$\sqrt{\frac{\gamma_{f3}^-}{\gamma_s^-}}\left(\frac{W_{sf1s} - 2\gamma_{sf1}^{LW}}{4}\right) + \sqrt{\gamma_s^-\gamma_{f3}^+} = \quad (19)$$
$$A = \frac{(\gamma_{f3}^{LW} - \gamma_{f1}^{LW})}{2} - \frac{(W_{sf3s} - W_{sf1s})}{4} + \sqrt{\gamma_{f3}^+\gamma_{f3}^-}.$$

Eqn. (19) can be solved for $\gamma_s^-$ as follows:

$$\gamma_s^- = \left(\frac{A \pm \sqrt{A^2 - \sqrt{\gamma_{f3}^+\gamma_{f3}^-}(W_{sf1s} - 2\gamma_{sf1}^{LW})}}{2\sqrt{\gamma_{f3}^+}}\right)^2. \quad (20)$$

The solution of Eqn. (20) for $\gamma_s^-$ can be used in Eqn. (18) to solve for $\gamma_s^+$, and the solutions for $\gamma_s^+$ and $\gamma_s^-$ can be used to calculate the polar component $\gamma_s^P$ of the surface energy of the solid as follows:

$$\gamma_s^P = 2\sqrt{\gamma_s^+\gamma_s^-}. \quad (21)$$

The solution of Eqn. (13) for $\gamma_s^{LW}$ and the solution of Eqn. (21) for $\gamma_s^P$, can be combined to calculate the solid surface energy of the sample at the scan location utilizing Eqn. (6) as follows:

$$\gamma_s = \gamma_s^{LW} + \gamma_s^P. \quad (22)$$

The wettability of the sample at the scan location can be represented by the contact angle θ of a liquid on the sample. The contact angle θ is a measurement of a dynamic equilibrium that occurs when a liquid/vapor interface meets a solid surface. The liquid should be chosen to preserve this equilibrium and not cause a complete surface wetting. The contact angle θ can be calculated using the Young-Dupre Equation as follows:

$$\theta = \arccos[(\gamma_{sf1} - \gamma_{sf2})/\gamma_{f1f2}]. \quad (23)$$

The parameter $\gamma_{f1f2}$ can be obtained from drop shape analysis experimentation or from the literature. The parameters $\gamma_{sf1}$ and $\gamma_{sf2}$ can be calculated using Eqn. (8) and Eqn. (10), respectively. The value of the contact angle θ can be used to determine if the rock sample is wetting, non-wetting or neutral. For example, if the contact angle θ is less than ninety degrees (θ<90°), then the sample surface is considered wetting. If the contact angle θ is greater than ninety degrees (θ>90°), then the sample surface is considered non-wetting. If the contact angle θ is equal to ninety degrees (θ=90°), then the sample surface is considered neutral.

The computation model as described herein can be embodied by a set of equations realized by programmed operations of the data analysis module 119C of the data processing system 119.

Methodology for Testing Reservoir Rock

Figure 3A:
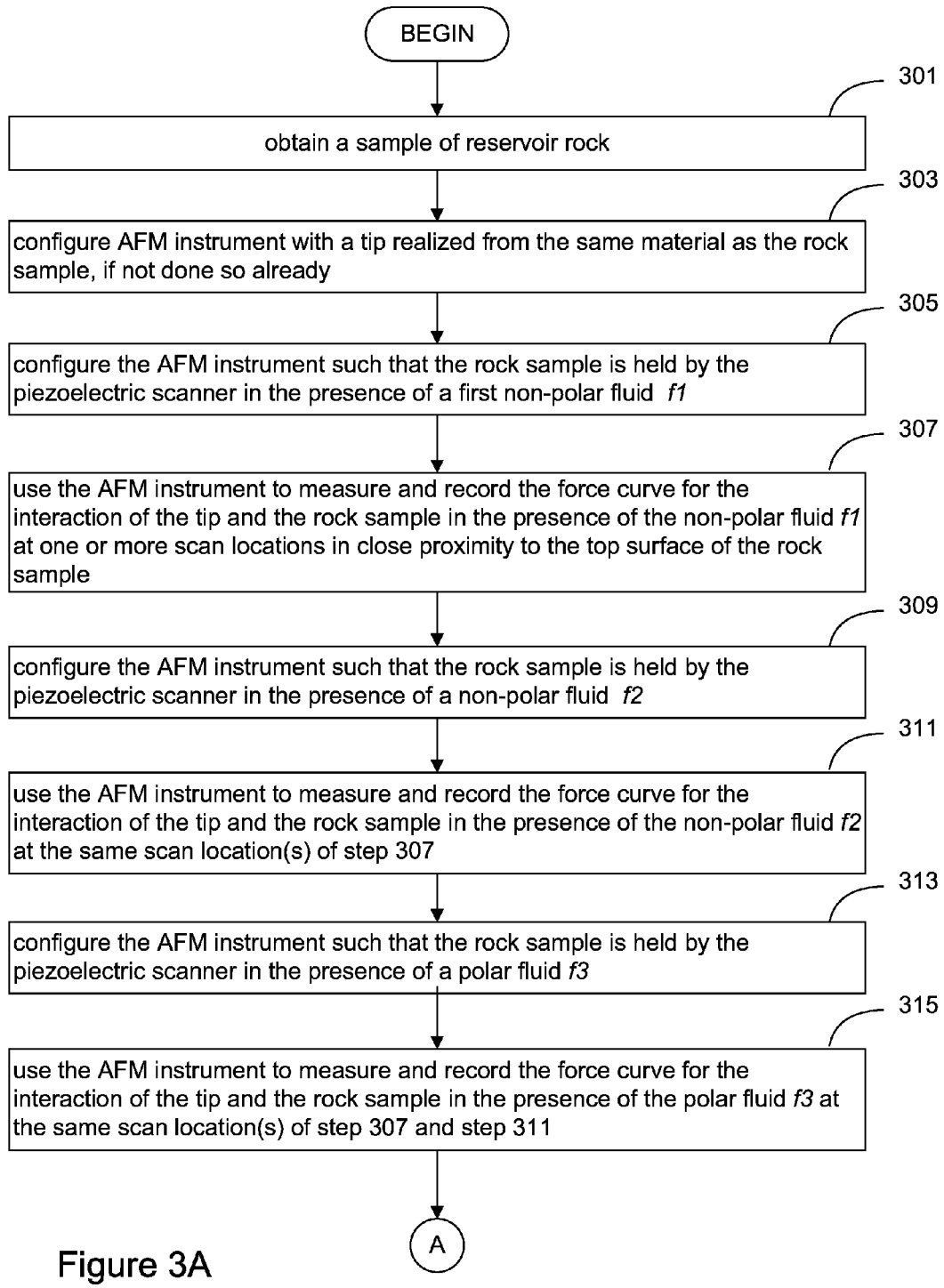
FIGS. 3A and 3B, collectively, is a flow chart of operations carried out by the AFM instrument of FIG. 1 in order to characterize at least one property of the rock sample at the given scan location. The properties can include total surface energy of the rock sample as well as wettability of the rock sample.
Figure 3B:
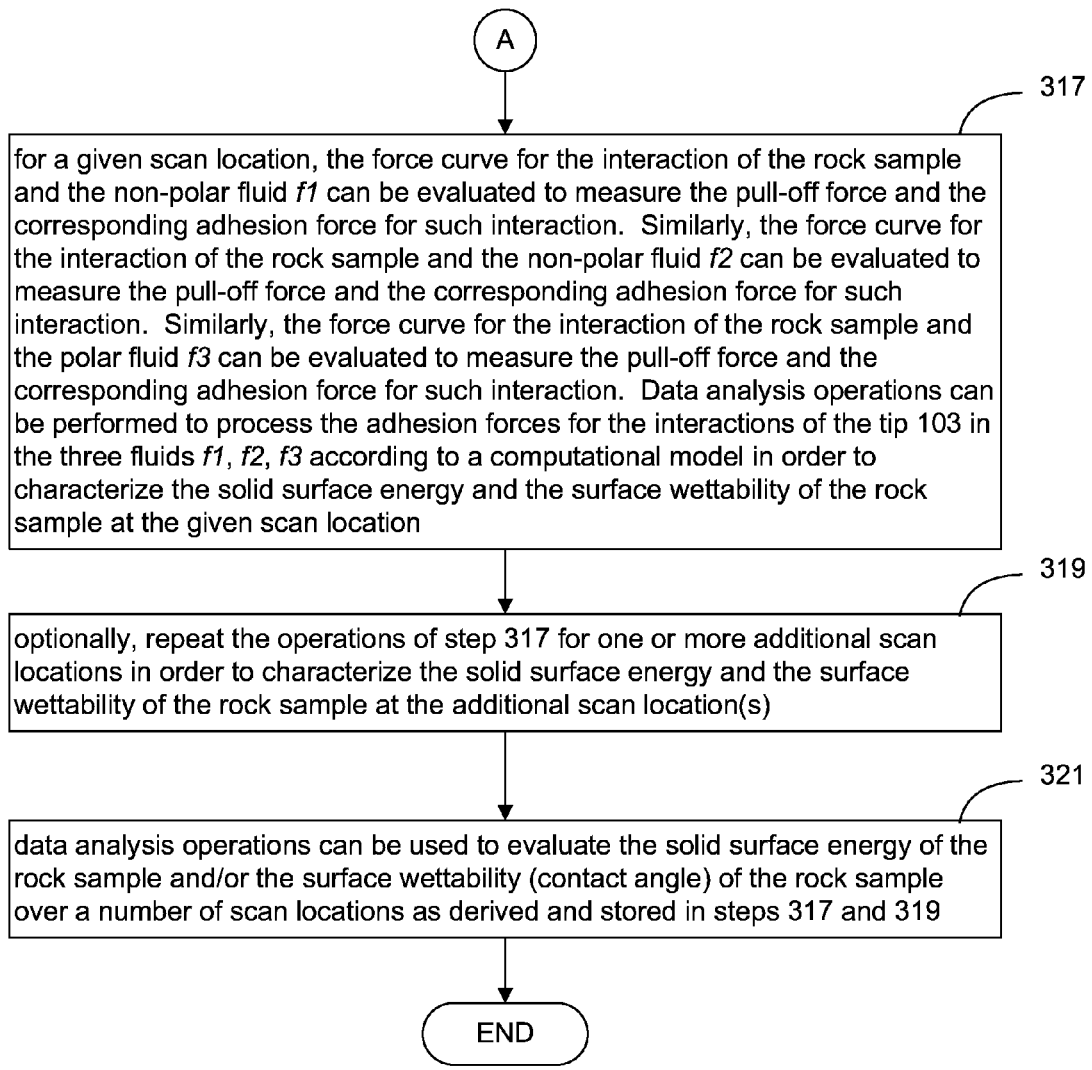

The apparatus of FIG. 1 (including programmed operations carried out by the data analysis module 119C that embody the computational model as described above) can be configured to perform operations that characterize a number of properties of a reservoir rock sample for a large number of scan locations over a sub-micron scale. Such properties can include the solid surface energy of the reservoir rock sample and the wettability of the reservoir rock sample at each scan location. An embodiment of such operations is outlined in the flowchart of FIGS. 3A and 3B, which begins with process 301 where a sample of reservoir rock (referred to below as a "rock sample") is obtained. The rock sample can be obtained by slicing a rock core obtained with use of a coring tool (such as drilling-type coring tool, a percussion sidewall coring tool or a rotary sidewall coring tool). The rock sample can also be prepared by laser etching and microtomy.

In process 303, the AFM instrument 100 is configured with the tip 103 realized from the same material as the rock sample, if it is not done so already. In one embodiment, the material of the rock sample of process 301 is cut and machinated to have a spherical or cubic shape suitable for the tip. The radius of the shaped rock material of the tip can have a radius within a range of 10-20 μm. A tipless cantilever beam, which is sold commercially, is used as a support for the shaped rock material of the tip. A micro-manipulator system can be used to bring the end of the cantilever beam into contact with a thin layer of UV curable glue deposited on a microscope slide. The glued end of the cantilever can then be brought into contact with the shaped rock sample of the tip, which is attached to the same microscope slide by capillary forces. The glue can then be allowed to cure, for example under a UV lamp for approximately 30 min.

In process 305, the AFM instrument 100 is configured such that the rock sample is held by the piezoelectric scanner 107 in the presence of a first non-polar fluid f1 that covers the top surface of the rock sample. In this configuration, the first non-polar fluid f1 is disposed between the tip 103 and the rock sample.

In process 307, the AFM instrument 100 is used to measure and record the force curve for the interaction of the tip 103 and the rock sample in the presence of non-polar fluid f1 at one or more scan locations in close proximity to the top surface of the rock sample.

In process 309, the AFM instrument 100 is configured such that the rock sample is held by the piezoelectric scanner 107 in the presence of a second non-polar fluid f2 that covers the top surface of the rock sample. In this configuration, the second non-polar fluid f2 is disposed between the tip 103 and the rock sample. The second non-polar fluid f2 is different from the first non-polar fluid f1. Examples of non-polar fluids suitable for the non-polar fluids f1 and f2 include diiodomethane, alpha-Bromonaphtalene and n-alkanes. Other suitable non-polar fluids can be used for fluids f1 and f2.

In process 311, the AFM instrument is used to measure and record the force curve(s) for the interaction of the tip 103 and the rock sample in the presence of non-polar fluid f2 at the same scan location(s) of process 307.

In process 313, the AFM instrument 100 is configured such that the rock sample is held by the piezoelectric scanner 107 in the presence of a third polar fluid f3 that covers the top surface of the rock sample. In this configuration, the third polar fluid f3 is disposed between the tip 103 and the rock sample. The third polar fluid f3 is different from the first and second non-polar fluids f1, f2. Examples of polar fluids suitable for the polar fluid f3 include water, ethylene glycol, glycerol, ethanol, and methanol. Other suitable polar fluids can be used for fluid f3.

In process 315, the AFM instrument 100 is used to measure and record the force curve(s) for the interaction of the tip 103 and the rock sample in the presence of polar fluid f3 at the same scan location(s) of processes 307 and 311.

In process 317, for a given scan location, the force curve for the interaction of the rock sample and the non-polar fluid f1 can be evaluated to measure the pull-off force $F_{pull-off}$ and the corresponding adhesion force $F_{adh}$ for such interaction. Similarly, the force curve for the interaction of the rock sample and the non-polar fluid f2 can be evaluated to measure the pull-off force $F_{pull-off}$ and the corresponding adhesion force $F_{adh}$ for such interaction. Similarly, the force curve for the interaction of the rock sample and the polar fluid f3 can be evaluated to measure the pull-off force $F_{pull-off}$ and the corresponding adhesion force $F_{adh}$ for such interaction. The programmed operations carried out by the data analysis module 119C can be configured to process the adhesion force $F_{adh}$ for the interactions of the tip 103 in the three fluids f1, f2, f3 according to the computational model as described above in order to characterize the solid surface energy and the wettability of the rock sample at the given scan location.

In one embodiment, the data analysis of process 317 can involve computational operations based on the computational model as described above (specifically, Eqn. (3) or (4)) that derive and store a data value representing the work of adhesion $W_{sf1s}$ for the interaction of the rock sample and the non-polar fluid f1, a data value representing the work of adhesion $W_{sf2s}$ for the interaction of the rock sample and the non-polar fluid f2, and a data value representing the work of adhesion $W_{sf3s}$ for the interaction of the rock sample and the polar fluid f3. The data values calculated for $W_{sf1s}$, $W_{sf2s}$, $W_{sf3s}$ can be used in conjunction with computational operations based on the computational model as described above (specifically, Eqn. (13)) to calculate a data value representing the component $\gamma_s^{LW}$ of the surface energy of the rock sample. Furthermore, the values calculated for $W_{sf1s}$, $W_{sf2s}$, $W_{sf3s}$ can be used in conjunction with computational operations based on the computational mathematical model as described above (specifically, Eqns. (18), (20) and (21)) to calculate the component $\gamma_s^P$ of the surface energy of the rock sample. The value of the component $\gamma_s^{LW}$ and the value of the component $\gamma_s^P$ can be combined according to Eqn. (22) to calculate solid surface energy of the rock sample at the given scan location. The surface wettability (contact angle $\theta$) of the reservoir rock at the given scan location can be calculated according to the Eqn. (23). The solid surface energy of the rock sample at the given scan location and the surface wettability of the reservoir rock at the given scan location can be stored for subsequent analysis.

In process 319, the analysis of process 317 can be performed for additional scan locations.

In process 321, data analysis operations can be used to evaluate the solid surface energy of the rock sample over a number of scan locations as derived and stored in processes 317 and 319. Similarly, data analysis operations can be used to evaluate the surface wettability (contact angle $\theta$) of the rock sample over a number of scan locations as derived and stored in processes 317 and 319.

In one embodiment, as part of process 321, the value of the contact angle $\theta$ can be used to determine if the top surface of the rock sample is wetting, non-wetting or neutral at the given scan location. For example, if the contact angle $\theta$ is less than ninety degrees (0<90°), then the top surface of the rock sample is considered wetting at the given scan location. If the contact angle $\theta$ is greater than ninety degrees (0>90°), then the top surface of the rock sample is considered non-wetting at the given scan location. If the contact angle $\theta$ is equal to ninety degrees (0=90°), then the top surface of the rock sample is considered neutral at the given scan location.

The data analysis operations of process 321 can also be used to evaluate variations in the solid surface energy and/or the surface wettability of the rock sample over a number of scan locations at sub-micron scale. For example, variation of rock properties based on major rock heterogeneities present at the surface can be captured and analyzed. The scan locations can be selected to capture such property variations.

Advantageously, the apparatus and methods of the present disclosure provide an accurate measurement of surface properties of rock samples (including total surface energy and surface wettability) in a manner that accounts for rock surface morphology and rock/fluids interactions at sub-micron scale, which can translate into better planning of production and enhanced recovery.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method of characterizing properties of a sample of reservoir rock comprising:
   i) configuring an Atomic Force Microscopy (AFM) instrument to have a probe with a tip realized from reservoir rock that corresponds to the reservoir rock of the sample;
   ii) using the AFM instrument as configured in i) to derive and store data representing adhesion forces between the tip and the sample at one or more scan locations in the presence of a number of different fluids disposed between the tip and the sample; and
   iii) performing computational operations that process the data as derived and stored in ii) for a given scan location in order to characterize at least one property of the rock sample at the given scan location.

2. The method according to claim 1, wherein:
the adhesion forces are derived from data representing force curves measured by the AFM instrument in the presence of the number of different fluids disposed between the tip and the sample.

3. The method according to claim 1, wherein:
the adhesion forces are derived from a measure of a cantilever beam deflection that is derived by the AFM instrument in the presence of the number of different fluids disposed between the tip and the sample.

4. The method according to claim 1, wherein:
the operations of ii) and iii) are performed over a number of scan locations in order to characterize at least one property of the rock sample over the number of scan locations.

5. The method according to claim 1, wherein:
the at least one property of the rock sample comprises solid surface energy of the rock sample.

6. The method according to claim 5, wherein:
the computational operations derive solid surface energy of the rock sample by combining a first surface energy component arising from dispersion forces and a second surface energy component arising from polar forces related to hydrogen bonding.

7. The method according to claim 6, wherein:
the second surface energy component is based on two complementary parameters ($\gamma^+$, $\gamma^-$), where $\gamma^+$ is an electron-acceptor surface tension parameter and $\gamma^-$ is an electron donor surface tension parameter.

8. The method according to claim 7, wherein:
the computational operations derive a work of adhesion between the tip and the sample for two cases involving two different fluids f1 and f2, and the computational operations derive the first surface energy component by subtracting the work of adhesion for the two cases involving the two different fluids f1 and f2.

9. The method according to claim 8, wherein:
the two different fluids f1 and f2 are non-polar fluids.

10. The method according to claim 9, wherein:
the computational operations derive the first surface energy component according to an equation of the form $$\gamma_s^{LW} = \left( \frac{(\gamma_{f1}^{LW} - \gamma_{f2}^{LW}) - \frac{(W_{sf1s} - W_{sf2s})}{2}}{2(\sqrt{\gamma_{f1}^{LW}} - \sqrt{\gamma_{f2}^{LW}})} \right)^2 ;$$

where $W_{sf1s}$ is a work of adhesion between the tip and the sample in the presence of the non-polar fluid f1;
$W_{sf2s}$ is a work of adhesion between the tip and the sample in the presence of the non-polar fluid f2;
$\gamma_{f1}^{LW}$ is a surface energy parameter for the non-polar fluid f1; and
$\gamma_{f2}^{LW}$ is a surface energy parameter for the non-polar fluid f2.

11. The method according to claim 9, wherein:
the computational operations derive a work of adhesion between the tip and the sample for two cases involving two different fluids f1 and f3, and the computational operations derive the parameters ($\gamma^+$, $\gamma^-$) by subtracting the work of adhesion for the two cases involving the two different fluids f1 and f3.

12. The method according to claim 11, wherein:
the fluid f1 is a non-polar fluid and the fluid f3 is a polar fluid.

13. The method according to claim 12, wherein:
the computational operations derive the parameters $\gamma_s^+$ and $\gamma_s^-$ according to equations of the form $$\gamma_s^+ = \left[ \frac{(W_{sf1s} - 2\gamma_{sf1}^{LW})}{4\sqrt{\gamma_s^-}} \right]^2 ,$$

and $$\gamma_s^- = \left( \frac{A \pm \sqrt{A^2 - \sqrt{\gamma_{f3}^+ \gamma_{f3}^-}(W_{sf1s} - 2\gamma_{sf1}^{LW})}}{2\sqrt{\gamma_{f3}^+}} \right)^2 ,$$

where $$A = \frac{(\gamma_{f3}^{LW} - \gamma_{f1}^{LW})}{2} - \frac{(W_{sf3s} - W_{sf1s})}{4} + \sqrt{\gamma_{f3}^+ \gamma_{f3}^-} ,$$

$W_{sf1s}$ is a work of adhesion between the tip and the sample in the presence of non-polar fluid f1;
$W_{sf3s}$ is a work of adhesion between the tip and the sample in the presence of polar fluid f3;
$\gamma_{f1}^{LW}$ is a surface energy parameter for the non-polar fluid f1; and
$\gamma_{f3}^{LW}$, $\gamma_{f3}^+$, and $\gamma_{f3}^-$ are surface energy parameters for the polar fluid f3.

14. The method according to claim 1, wherein:
the at least one property of the rock sample comprises surface wettability of the rock sample.

15. The method according to claim 14, wherein:
the at least one property of the rock sample comprises a contact angle of a liquid on the rock sample.

16. The method according to claim 14, wherein:
the computational operations derive the contact angle θ of a liquid on the rock sample according to an equation of the form $$\theta = \arccos[(\gamma_{sf1} - \gamma_{sf2})/\gamma_{f1f2}],$$

where $\gamma_{sf1}$ is a surface energy parameter for a non-polar fluid f1;
$\gamma_{sf2}$ is a surface energy parameter for a non-polar fluid f2; and
$\gamma_{f1f2}$ is an interfacial surface energy parameter for the non-polar fluids f1 and f2.

17. The method according to claim 16, wherein:
the computational operations compare the value of the contact angle θ of the rock sample to at least one predetermined value to classify the rock sample as one of wetting, non-wetting, and neutral.

18. An Atomic Force Microscopy (AFM) instrument for characterizing properties of a sample of reservoir rock, comprising:
a probe with a cantilever beam that supports a tip realized from reservoir rock that corresponds to the reservoir rock of the sample;
a sample holder spaced from the tip of the probe, wherein the sample holder is configurable to hold the sample for testing;
a scan mechanism that provides controlled movement of the sample holder relative to the tip of the probe;
a sensing system configured to measure deflection of the cantilever beam; and
a data processing system, operably coupled to both the scan mechanism and the sensing system, that is configured to perform operations that derive and store data representing adhesion forces between the tip and the sample at one or more scan locations in the presence of a number of different fluids disposed between the tip and the sample, wherein the data processing system is further configured to perform computational operations that process the data representing the adhesion forces between the tip and the sample for a given scan location in order to characterize at least one property of the rock sample at the given scan location.

19. The AFM instrument according to claim 18, wherein:
the data processing system is configured to derive the adhesion forces from data representing force curves measured by the AFM instrument in the presence of the number of different fluids disposed between the tip and the sample.

20. The AFM instrument according to claim 18, wherein:
the data processing system is configured to derive the adhesion forces from a measure of the cantilever beam deflection that is derived by the AFM instrument in the presence of the number of different fluids disposed between the tip and the sample.

21. The AFM instrument according to claim 18, wherein:
the at least one property of the rock sample comprises solid surface energy of the rock sample.

22. The AFM instrument according to claim 18, wherein:
the at least one property of the rock sample comprises surface wettability of the rock sample.

23. The AFM instrument according to claim 18, wherein:
the at least one property of the rock sample comprises a contact angle of a liquid on the rock sample.

24. An Atomic Force Microscopy (AFM) instrument for characterizing properties of a sample of reservoir rock, comprising a probe with a cantilever beam that supports a tip realized from reservoir rock that corresponds to the reservoir rock of the sample.

* * * * *